Patented Dec. 6, 1949

2,490,399

UNITED STATES PATENT OFFICE 2,490,399

GOLD COMPOUNDS AND CERAMIC-DECORATING COMPOSITIONS CONTAINING SAME

Kermit H. Ballard, Perth Amboy, N. J., assignor to E. I. du Pont de Nemours & Company, Wilmington, Del., a corporation of Delaware No Drawing. Application September 13, 1947, Serial No. 773,920

11 Claims. (Cl. 260—79.7)

This invention relates to new gold compounds and gold ceramic-decorating compositions containing the same.

The art of decorating ceramics, i. e., glass, china, and porcelain, with designs in gold has been known for many years. The gold compound used in such decorating compositions is a so-called gold resinate prepared by reacting a terpene sulfide with gold chloride or potassium chloroaurate, $KAuCl_4$. In accordance with Boudnikoff, Comp. rend. 196, 1898–9 (1933), a terpene sulfide is first prepared by mixing a terpene such as Venice turpentine with sulfur flowers or nitrogen sulfide, $N_4S_4$, and boiling the same for an hour and a half at 160° C. to 170° C. To the resulting terpene sulfide is added a solution of potassium chloroaurate, $KAuCl_4$, in methyl alcohol. This mixture is stirred and after one hour the alcohol is evaporated. The residue is dissolved in chloroform and is neutralized with sodium carbonate and filtered. The filtered liquid is poured into methyl alcohol to precipitate the gold resinate. The resinate is dissolved in certain essential oils, such as rosemary and fennel oils, and certain fluxes are added thereto. The fluxes disclosed in this reference were rhodium resinate dissolved in sassafras oil, bismuth liquor, chromium liquor and Assyrian asphalt dissolved in nitrobenzol. Finally a thickener is added, resin in fennel oil, and the composition, containing 12% to 16% gold, is ready for application to ceramics and firing to produce a brilliant film of gold.

The previously known processes for the production of gold compounds and the subsequent utilization of these gold compounds in ceramic-decorating compositions, as illustrated by the above-described process, had several disadvantages. In the first place, the reaction between gold chloride or potassium chloraurate and a terpene sulfide generally produces yields of only 70% to 80%, based on the weight of the gold compound employed. Consequently, considerable expense is added due to losses or refining costs for recovery. Secondly, the gold resinate always has a dark brown or greenish-black color and, therefore, makes it impossible to color the liquid gold with different fugitive dyes for intricate application work. The gold resinate also has a very limited solubility in the solvents used for decorating compositions, i. e., a slight excess of the resinate will produce a composition which is too viscous for ease of application. The previously known gold decorating compositions were also somewhat unstable and after standing they contain a considerable amount of sediment.

It is, therefore, one of the objects of this invention to produce gold compounds for ceramic-decorating compositions which do not have the objectionable characteristics of previously known gold compounds.

It is another object of this invention to produce gold compounds for ceramic-decorating compositions which will have a higher degree of chemical stability, a higher degree of solubility in solvents, and which can be produced in greater yields than previously known gold compounds used in gold ceramic-decorating compositions.

It is still another object of this invention to produce new gold compounds.

It is a still further object of this invention to produce new gold ceramic-decorating compositions.

Other objects of this invention will appear hereinafter.

The objects of this invention may be accomplished, in general, by reacting an aqueous solution of auric chloride with a terpene mercaptan to produce a white or light-colored resinous compound, and removing the resinous compound from any liquid present.

The resulting resinous compound, which is believed to be terpene gold mercaptide, may be dissolved in any suitable solvent or solvent mixture, and with the addition of a flux such as conventionally used in gold ceramic-decorating compositions, may be applied to ceramics and fired in the usual manner to produce an adherent, brilliant gold film on the ceramic ware.

Although any commercial grade of auric chloride may be used, particularly good results have been obtained with auric chloride prepared by dissolving metallic gold in aqua regia and decomposing the nitric acid present by repeated evaporations with hydrochloric acid.

The terpene mercaptan may be produced by sulfurization of a terpene and hydrogenation of the terpene-sulfur reaction product. Suitable terpene mercaptans may be produced by the sulfurization and hydrogenation steps disclosed in Fox Patent No. 2,407,265. The examples in this patent disclose, in detail, the production of alpha-pinene mercaptan, beta-pinene mercaptan, dipentene mercaptan, terpinolene mercaptan, menthene mercaptan, alpha-terpineol mercaptan, and camphene mercaptan.

In accordance with the preferred method of this invention, auric chloride is dissolved in water to produce an aqueous auric chloride solution containing between 75 and 125 parts gold per 225 parts solution. The aqueous auric chloride solution may be poured into 200 to 600 parts of a terpene mercaptan, preferably while stirring the mixture, and preferably also while maintaining the temperature at between 40° C. and 100° C. The reaction is exothermic and, therefore, it may be necessary to first cool and then heat the mass to maintain the temperature. In order to obtain substantially complete reaction, the mixture is maintained within the above-mentioned temperature range for a period of between thirty minutes and eight hours. The auric chloride and terpene mercaptan react with each other to produce a resinous, sticky mass which may be removed by filtration, decantation, or the like, from any liquid present and dried. The resinous material is believed to be terpene gold mercaptide.

Preferably, the reaction between the aqueous auric chloride solution and the terpene mercaptan is carried out in the presence of a volatile diluent which is non-reactive with the chloride or mercaptan. As examples of volatile diluents which may be used for this purpose the following may be named: ethyl acetate, methanol, ethanol, propanol, butanol, ethyl or propyl ether, acetone, or the like. The volatile diluent aids in maintaining the proper temperature during the reaction, and in maintaining the reaction product in a more fluid form during the first part of the reaction; however, most of the diluent will volatilize from the mass during the reaction. The volatile diluent may be added to the aqueous auric chloride, in substantially equal weight, before it is mixed with the mercaptan.

After the reaction between the gold chloride and the mercaptan is completed, the resinous material may be separated from any liquid present in any desired manner. Conveniently, however, sufficient solvent is added to the reaction mass to dissolve the same. As a solvent for this purpose, chloroform is preferred; however, ethyl ether, ethylene oxide, or any other solvent which is non-reactive with the mass, may be used as well.

After the reaction mass is dissolved, it is precipitated in a liquid which is a non-solvent for the reaction product, for example, methanol or ethanol. Sufficient non-solvent precipitant is used to dilute the solvent and precipitate the resinous reaction product in its entirety.

The precipitated resinous gold reaction product is filtered from the precipitant, preferably rinsed with an additional amount of the precipitant, and dried. The material may be dried at any temperature between room temperature and about 90° C.

By reacting auric chloride with a terpene mercaptan, in accordance with this invention, a yield of the gold resinous reaction product of over 98%, based on the weight of the auric chloride is obtained. The gold resinous reaction product, instead of being very dark colored as in previously-known processes for the production of gold resinate, is white or very light-colored. This light-colored product can be given different tints or colors by means of organic dyestuffs which will be removed in the firing operation. As a result, gold decorating composition in different colors can be prepared whereby intricate gold designs are more easily applied to ceramic ware. The white, gold resinous reaction product of this invention is more stable than previously known gold resinates and can be stored for long periods of time without formation of sediment therein. The product of this invention also has a wider range of solubility in various solvents such as essential oils used in preparing gold decorating compositions without exhibiting unduly high viscosity, and, therefore, gold decorating compositions of the desired viscosity containing as high as 27% gold may be readily prepared. Moreover, the product of this invention may be dissolved in solvents which are not compatible with previously known gold resinates. The resinous gold compounds of this invention may also be used to prepare useful gold decorating compositions containing as little as 7% gold.

The following examples set forth in detail certain preferred processes for the production of gold resinous reaction products by reacting auric chloride, $AuCl_3$, with terpenes. It is to be understood that the invention is not to be limited to the specific details set forth in the examples.

EXAMPLE I

An aqueous auric chloride solution is prepared by dissolving 154 grams auric chloride in 71 grams of water to produce 225 grams of solution containing approximately 100 grams of gold. Two hundred and seventy-five (275) grams of ethyl acetate are added to the auric chloride solution. The auric chloride-ethyl acetate solution is then added, while stirring, to 400 grams of alpha-pinene mercaptan. The auric chloride immediately begins reacting with the mercaptan with the evolution of heat and boiling off of the ethyl acetate. The temperature of the reaction is maintained to between about 80° C. and 90° C. by the evaporation of the ethyl acetate which has a boiling point of 77° C. The reaction mass is continuously stirred, while being maintained at a temperature between 75° C. and 90° C., with external heating if necessary, for a period of about six hours whereby an amber-colored resinous reaction product is formed. After completion of the reaction, 500 grams of chloroform are added with stirring until the entire reaction mass has passed into solution. The chloroform solution of the reaction mass is then poured into 10,000 grams of methanol, whereby the resinous gold reaction product is precipitated in a purified, finely divided form. The finely divided gold compound is filtered off and rinsed with additional amounts of methanol, after which it is dried at a temperature of 60° C. to 65° C.

The resulting resinous gold reaction product is obtained in a yield of about 98%, based on the weight of the gold in the auric chloride employed in the reaction. The purified gold compound is white in color, and is soluble in essential oils such as rosemary oil, fennel oil, lavender oil, and anethole; terpenes such as dipentene, terpineol, terpentine and pinenes; hydrocarbon solvents such as xylene, toluene, benzene and kerosene; and other organic solvents such as amyl acetate, acetone, benzyl alcohol, monochlorobenzene, and the like. The gold product is very stable, showing no decomposition after aging in an oven at 65° C. for several weeks.

EXAMPLE II

Similar products, from a standpoint of colors, stability, and solubility, can be obtained by repeating the steps of Example I with the exception that, in turn, beta-pinene mercaptan, dipentene mercaptan, terpinolene mercaptan, menthene mercaptan, alpha terpineol mercaptan, and camphene mercaptan are substituted for the alpha-pinene mercaptan of Example I.

EXAMPLE III

Repeat the steps of Example I with the omission of ethyl acetate, but employing cooling to regulate the temperature of the reaction to between 80° C. and 90° C. The reaction product, which has the form of a sticky, amber-colored mass, is then scraped from the bottom of the reaction vessel, omitting the step of dissolving in chloroform and precipitating in menthanol. This reaction product has substantially the same properties as the product of Example I. However, the yield, due to losses as a result of failure to dissolve the entire mass in a solvent and precipitate the same in a finely divided form, will be considerably lower. This process has a slight disadvantage in comparison to the process of Examples I and II in that the gold reaction product will have the somewhat undesirable odor of pinene mercaptan unless the ratio of gold chloride to terpene mercaptan is so high as to result in a lower yield than is otherwise obtainable.

EXAMPLE IV

The process of Example I may be repeated with the substitution of methanol, ethanol, propanol, or iso-propyl ether for the ethyl acetate, and with the substitution of ethyl ether, ethylene oxide, or xylene for the chloroform, with substantially identical results.

The resinous gold reaction product of the present invention may be dissolved in a suitable solvent together with a suitable gold-flux to produce a finished gold decorating compound that may be applied in the usual way by painting, printing, application with a silk screen stencil, or the like, on china, porcelain, or glass, and fired to produce a brilliant gold decoration.

The particular solvent or mixture of solvents used for a gold decorating composition is a matter of choice depending upon the method of application used, for example, whether the gold decorating composition is to be applied by a stamping operation, by a painting operation, a printing operation, or by means of a squeegee through a screen stencil. The different solvents used will impart to the composition differences in interfacial tension, surface tension, evaporation rate, viscosity, etc. As a consequence, different manufacturers of gold decorating compositions recommend different solvents and mixtures of solvents to impart specific application characteristics to the gold decorating compositions used for any particular purpose. Furthermore, different solvents and mixtures of solvents are recommended for different methods of application. Since the gold compounds of this invention have a wide solubility range and are soluble in all previously known solvents for decorating compositions, not only can the same solvents and solvent systems be used as were used with previously known gold compounds, but many new solvents and solvent mixtures can be formulated. Solvents heretofore used in gold decorating compositions, singly and in combination, include lavender oil, rosemary oil, anethole, fennel oil, aniseed oil, various terpenes, camphor, amyl acetate, methyl salicylate, benzyl alcohol, monochlorobenzene, nitrotoluene, and turpentine. The gold compound of this invention is soluble in these various solvents as well as hydrocarbon solvents such as xylene, toluene, benzene, kerosene, and many other solvents.

An example of a very suitable solvent for a so-called "stamping gold" composition comprises the following in the proportions set forth:

Solvent A

| | Parts |
|---|---|
| Ortho nitrotoluene | 40 |
| Methyl salicylate | 25 |
| Anethole | 15 |
| Benzyl alcohol | 20 |
| Total | 100 |

A particularly desirable solvent for a "handbanding" gold composition contains the following:

Solvent B

| | Parts |
|---|---|
| Synthetic camphor | 15 |
| Cineol | 25 |
| Ortho nitrotoluene | 30 |
| Spike lavender oil | 10 |
| Monochlorobenzene | 20 |
| Total | 100 |

The particular gold-flux used in any given gold decorating composition is largely a matter of choice and also depends somewhat upon the type of ceramic material to be decorated therewith. A gold-flux is used in a gold decorating composition for the purpose of promoting firm adherence of the fired gold film to the ceramic, and also to promote brilliance of the gold film. A number of fluxing materials which will enhance adherence and brilliance of gold films are known in the art. For example, small amounts of bismuth nitrate, bismuth trichloride, rhodium chloride, chromium chloride, and tin chloride have been used for this purpose. Any of the fluxes heretofore used in the art to promote proper appearance and adherence may be used with the gold compound of this invention to likewise promote appearance and adherence. A number of fluxes are usually used in combination with each other to produce most satisfactory results in the ultimate fired gold film.

The following examples illustrate flux compositions which may be added to the resinous gold product of this invention to produce particularly desirable adherent, brilliant gold films after the decorating composition is fired in a ceramic material.

Flux A

| | Parts |
|---|---|
| Bismuth trichloride | 5 |
| Ethylene chlorohydrin | 94 |
| Hydrochloric acid (conc.) | 1 |
| Total | 100 |

Flux B

| | Parts |
|---|---|
| Rhodium chloride | 40 |
| Methanol | 60 |
| Total | 100 |

Flux C

Weigh into a 2-liter beaker:

| | Grams |
|---|---|
| Pine rosin | 3.4 |
| Cyclohexanol | 50.9 |
| Oil of cloves | 12.6 |
| Rosemary oil | 12.7 |
| Spike lavender oil | 3.4 |
| Dissolve the above by stirring, and then add the same dropwise to | |
| Silicon tetrachloride | 17.0 |
| Total | 100 |

Heat the mass to 120° C. to 130° C. for a sufficient period of time to evaporate the 100-gram batch to a net weight of 30 grams.

Gold decorating compositions are usually prepared by mixing the gold resinate, solvent, and flux in such proportions that the composition will contain between 10% and 20% gold. In order to obtain a composition having the proper viscosity, it is sometimes desirable to add viscosifying agents such as pine rosin or a mixture of pine rosin and sulfur to the composition. Particularly gratifying results have been obtained by the use of a viscosifying agent of the following composition:

Viscosifying agent A

| | Parts |
|---|---|
| Pine rosin | 90 |
| Flowers of sulfur | 10 |
| Total | 100 |

The following examples illustrate certain preferred gold decorating compositions containing the resinous gold reaction product of this invention in combination with the specific solvent mixtures, fluxes, and viscosifying agents set forth in detail above.

EXAMPLE V

This example illustrates a liquid, bright gold decorating composition, containing 11% gold, which is particularly useful for the decoration of chinaware. The composition may be applied to chinaware in any desired manner, and then firing the chinaware at a temperature of between 600° C. and 700° C. to produce an adherent, brilliant gold film thereon.

| | Parts |
|---|---|
| The resinous gold reaction product obtained by the method of Example I | 22.0 |
| Viscosifying agent A | 20.8 |
| Solvent B | 53.4 |
| Flux A | 3.0 |
| Flux B | 0.3 |
| Flux C | 0.5 |
| Total | 100 |

EXAMPLE VI

This example illustrates a liquid, bright gold decorating composition for chinaware containing 14% gold.

| | Parts |
|---|---|
| The gold reaction product of Example I | 28.0 |
| Pine rosin | 18.8 |
| Turpentine | 50.4 |
| Flux A | 2.0 |
| Flux B | 0.3 |
| Flux C | 0.5 |
| Total | 100 |

EXAMPLE VII

This example illustrates a liquid, bright gold decorating composition, containing 10% gold, which is particularly adapted for use in the decoration of glassware. The composition may be applied to the glassware by painting, stamping, printing, or the like, and the glassware fired to a temperature 20° C. to 30° C. below the softening point of the glass.

| | Parts |
|---|---|
| The gold reaction product of Example I | 20.0 |
| Viscosifying agent A | 23.0 |
| Solvent B | 52.8 |
| Flux A | 3.0 |
| Flux B | 0.2 |
| Flux C | 1.0 |
| Total | 100 |

EXAMPLE VIII

This example illustrates a liquid, bright gold decorating composition, containing 11% gold, which is adapted for use in the decoration of glassware.

| | Parts |
|---|---|
| The gold reaction product of Example I | 22.0 |
| Pine rosin | 21.5 |
| Dipentene | 53.7 |
| Flux A | 2.0 |
| Flux B | 0.3 |
| Flux C | 0.5 |
| Total | 100 |

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. A liquid gold ceramic-decorating composition of the type composed of a resinous gold compound, a solvent therefor, and a gold-flux, said composition containing, as the resinous gold compound, the resinous gold reaction product of auric chloride and a cyclic terpene mercaptan.

2. A liquid gold ceramic-decorating composition of the type composed of a resinous gold compound, a solvent therefor, and a gold-flux, said composition containing, as the resinous gold compound, the resinous gold reaction product of auric chloride and a pinene mercaptan.

3. A liquid gold ceramic-decorating composition of the type composed of a resinous gold compound, a solvent therefor, and a gold-flux, said composition containing, as the resinous gold compound, a sufficient quantity of the resinous gold reaction product of auric chloride and a cyclic terpene mercaptan that the composition will contain 7% to 27% gold.

4. The reaction product of auric chloride and a cyclic terpene mercaptan.

5. The reaction product of auric chloride and a pinene mercaptan.

6. The process which comprises admixing an aqueous solution of auric chloride with a cyclic terpene mercaptan whereby to form a resinous gold reaction product.

7. The process which comprises admixing an aqueous solution of auric chloride with a cyclic terpene mercaptan and maintaining the temperature of the reaction between 40° C. and 100° C.

8. The process which comprises admixing an aqueous solution of auric chloride containing between 75 and 125 parts gold per 225 parts solution with 200 to 600 parts of a cyclic terpene mercaptan, and maintaining the temperature of the reaction between 40° C. and 100° C. whereby to form a resinous gold reaction product.

9. The process which comprises admixing an aqueous solution of auric chloride containing between 75 and 125 parts gold per 225 parts solution with 200 to 600 parts of a pinene mercaptan, and maintaining the temperature of the reaction between 40° C. and 100° C. whereby to form a resinous gold product.

10. The process which comprises admixing an aqueous solution of auric chloride containing between 75 and 125 parts gold per 225 parts solution with 200 to 600 parts of a cyclic terpene mercaptan and a non-reactive volatile solvent, and maintaining the reaction temperature between 40° C. and 100° C. whereby to form a resinous gold reaction product.

11. The process which comprises admixing an aqueous solution of auric chloride containing between 75 and 125 parts gold per 225 parts solution with 200 to 600 parts of a cyclic terpene mercaptan and a non-reactive volatile solvent, maintaining the reaction temperature between 40° C. and 100° C. whereby to form a resinous gold reaction product, dissolving the reaction product in a solvent therefor, and precipitating the dissolved resinous gold reaction product in a liquid non-solvent for said product.

KERMIT H. BALLARD.

REFERENCES CITED

The following references are of record in the file of this patent:

UNITED STATES PATENTS

| Number | Name | Date |
| --- | --- | --- |
| 1,954,353 | Ernst | Apr. 10, 1934 |
| 2,407,265 | Fox | Sept. 10, 1946 |

OTHER REFERENCES

Bondnikoff-Compte redus hebdomadavies des seances de l'academie des sciences, 196, 1898-9, (1933).